United States Patent
Allan et al.

(10) Patent No.: US 9,160,666 B2
(45) Date of Patent: Oct. 13, 2015

(54) ENCODING A PAYLOAD HASH IN THE DA-MAC TO FACILITATE ELASTIC CHAINING OF PACKET PROCESSING ELEMENTS

(71) Applicant: Telefonaktiebolaget L M Ericsson (publ), Stockholm (SE)

(72) Inventors: David Ian Allan, San Jose, CA (US); Eric Ward Gray, Pitman, NJ (US); Joel Halpern, Leesburg, VA (US); Scott Andrew Mansfield, Evans City, PA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 277 days.

(21) Appl. No.: 13/898,148

(22) Filed: May 20, 2013

(65) Prior Publication Data

US 2014/0341029 A1 Nov. 20, 2014

(51) Int. Cl.
| | |
|---|---|
| *G01R 31/08* | (2006.01) |
| *H04L 12/803* | (2013.01) |
| *H04L 12/933* | (2013.01) |
| *H04L 12/743* | (2013.01) |
| *H04L 12/751* | (2013.01) |
| *H04L 12/721* | (2013.01) |
| *H04L 12/24* | (2006.01) |

(52) U.S. Cl.
CPC .............. *H04L 47/125* (2013.01); *H04L 45/02* (2013.01); *H04L 45/38* (2013.01); *H04L 45/7453* (2013.01); *H04L 49/15* (2013.01); *H04L 41/12* (2013.01)

(58) Field of Classification Search
CPC ..................................................... H04L 47/125
USPC .................................. 370/389, 252–253, 235
See application file for complete search history.

(56) References Cited

U.S. PATENT DOCUMENTS

| | | | |
|---|---|---|---|
| 8,014,278 | B1 | 9/2011 | Subramanian et al. |
| 8,467,298 | B2 | 6/2013 | Gray et al. |
| 8,738,757 | B2 | 5/2014 | Allan et al. |
| 2004/0071134 | A1 | 4/2004 | Vadivelu |

(Continued)

OTHER PUBLICATIONS

Non-Final Office Action, U.S. Appl. No. 13/091,066, dated Dec. 20, 2012, 6 pages.

(Continued)

*Primary Examiner* — Iqbal Zaidi
(74) *Attorney, Agent, or Firm* — Nicholson De Vos Webster & Elliott, LLP

(57) ABSTRACT

A method is implemented in a network element of a service network. The network element executes a packet processing element (PPE) of a plurality of PPEs, where each PPE in the plurality of PPEs executes a stage of packet processing for the service network and where the plurality of PPEs are connected to one another by a plurality of switch fabrics. The PPEs self-select a subset of a set of equivalent service chains to service with each service chain defining a subset and sequence of the plurality of PPEs. Each PPE self-selects the subset of equivalent service chains to process based upon knowledge of the plurality of PPEs servicing that stage of the full set of service chains such that there is spreading of load across all available PPEs in that stage. There is no single point of failure and minimal reassignment of PPEs for a set of equivalent data flows traversing the plurality of PPEs of the service network for changes in topography of the plurality of PPEs in the service network.

19 Claims, 12 Drawing Sheets

(56) References Cited

U.S. PATENT DOCUMENTS

| | | |
|---|---|---|
| 2004/0264374 A1 | 12/2004 | Yu et al. |
| 2005/0038890 A1 | 2/2005 | Masuda et al. |
| 2005/0276263 A1 | 12/2005 | Suetsugu et al. |
| 2006/0198381 A1 | 9/2006 | Elangovan et al. |
| 2009/0193105 A1 | 7/2009 | Charny et al. |
| 2010/0265824 A1 | 10/2010 | Chao et al. |
| 2012/0120803 A1 | 5/2012 | Farkas et al. |
| 2012/0176904 A1 | 7/2012 | Gray et al. |
| 2012/0179800 A1 | 7/2012 | Allan et al. |
| 2012/0224477 A1 | 9/2012 | Balasubramanian et al. |
| 2012/0226804 A1* | 9/2012 | Raja et al. ............. 709/224 |
| 2012/0239626 A1 | 9/2012 | Aysan et al. |

OTHER PUBLICATIONS

Non-Final Office Action, U.S. Appl. No. 13/346,474, dated Aug. 14, 2013, 10 pages.

Notice of Allowance, U.S. Appl. No. 13/091,066, dated Feb. 14, 2013, 7 pages.

Notice of Allowance, U.S. Appl. No. 13/346,474, dated Jan. 17, 2014, 12 pages.

* cited by examiner

ENCODING A PAYLOAD HASH IN THE DA-MAC TO FACILITATE ELASTIC CHAINING OF PACKET PROCESSING ELEMENTS

FIELD OF THE INVENTION

The embodiments of the invention relate to a method and system for improving the scaling and resiliency of service delivery in a network. Specifically, the embodiments of the invention relate to the improved use of a load balancing table populated with next hop discriminators to diminish disruption to data traffic that is spread across a set of packet processing elements (PPE) that perform packet services in a service chain that are caused by changes in the set of available PPEs.

BACKGROUND

Service chaining is a process where a set of packet processing elements (PPE) perform a set of functions on data traffic received at the edge of a network or under similar circumstances. The PPE can be local to or remote from an ingress router where the data traffic is received. The data traffic after processing is returned to the ingress router for forwarding toward a destination. Service chaining usually involves creating a daisy chain of stateful PPEs. A load balancing (LB) function can be implemented between each stage of the daisy chain or with a single LB function at the ingress router.

Use of a single LB function at the ingress router requires that a full service chain of additional PPEs must be instantiated to add capacity during times of heavy usage, which can be an inefficient use of resources when only a single packet processing element in a set of otherwise available PPEs is overloaded. The single LB function at the ingress router also produces a chain of single points of failure (i.e., a failure of any PPE in a service chain causes the whole service chain to fail). Thus, the use of the single LB function at the ingress router is both fragile and requires significant overcapacity in proportion to the likelihood of failure of any PPE.

Implementing separate load balancing functions that examine multiple fields in a packet (what is typically known as a 5-tuple) in order to make load balancing decisions at each stage of a service chain is also overly resource intensive. The load balancing function either requires significant amounts of state, coordination and messaging overhead to enable proper functioning over multiple stages to configure the load balancing or a broadcasting of the data traffic to between stages.

SUMMARY OF THE INVENTION

A method is implemented in a network element of a service network. The network element executes a packet processing element (PPE) of a plurality of PPEs, where each PPE in the plurality of PPEs executes a stage of packet processing for the service network and where the plurality of PPEs are connected to one another by a plurality of switch fabrics. The PPEs self-select a subset of a set of equivalent service chains to service with each service chain defining a subset and sequence of the plurality of PPEs. Each PPE self-selects the subset of equivalent service chains to process based upon knowledge of the plurality of PPEs servicing that stage of the full set of service chains such that there is spreading of load across all available PPEs in that stage. There is no single point of failure and minimal reassignment of PPEs for a set of equivalent data flows traversing the plurality of PPEs of the service network for changes in topology of the plurality of PPEs in the service network. The method includes a set of steps including detecting a change in the topology of the plurality of PPEs and generating a next load balancing (LB) table to adjust service chain routes for the changed topology. The generating of the LB tables uses a shared transform algorithm to replace a current LB table. The next LB table and the current LB table identify next hops for all service chains in the service network. The current LB table and the next LB table are shared with the plurality of PPEs in the service network. The PPE transitions to the next LB table by replacing the current LB table and programs an upstream switch fabric to forward to itself a specific subset of frames selected by the PPE for processing according to the next LB table.

A network element is disclosed in a service network that executes a packet processing element (PPE) that is one of a plurality of PPEs, where each PPE in the plurality of PPEs executes a stage of packet processing for the service network and where the plurality of PPEs are connected to one another by a plurality of switch fabrics. The PPE self-selects a subset of a set of equivalent service chains to service with each service chain defining a subset and sequence of the plurality of PPEs. The PPE self-selects the subset of equivalent service chains to process based upon proper knowledge of the plurality of PPEs servicing that stage of the full set of service chains such that there is spreading of load across all available PPEs in that stage. There is no single point of failure and minimal reassignment of PPEs for a set of equivalent data flows traversing the plurality of PPEs of the service network caused by changes in topology of the plurality of PPEs in the service network. The network element comprises a memory to provide data storage for a network processor. The network processor is coupled to the memory and the network processor is configured to execute the PPE. The PPE includes a load balancing (LB) synchronization module, an LB table management module, an LB generation module and a switch configuration module. The LB synchronization module is configured to detect a change in the topology of the plurality of PPEs and share a current LB table and next LB table with the plurality of PPEs in the service network. The LB table management module is configured to transition the PPE to the next LB table by replacing the current LB table. The LB generation module is configured to generate the next load balancing (LB) table to adjust service chain routes for the changed topology where the generation uses a shared transform algorithm to replace the current LB table. The next LB table and the current LB table identifying next hops for all service chains in the service network. The switch configuration module is configured to program an upstream switch fabric to forward to itself a specific subset of frames selected by the PPE for processing according to the next LB table.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
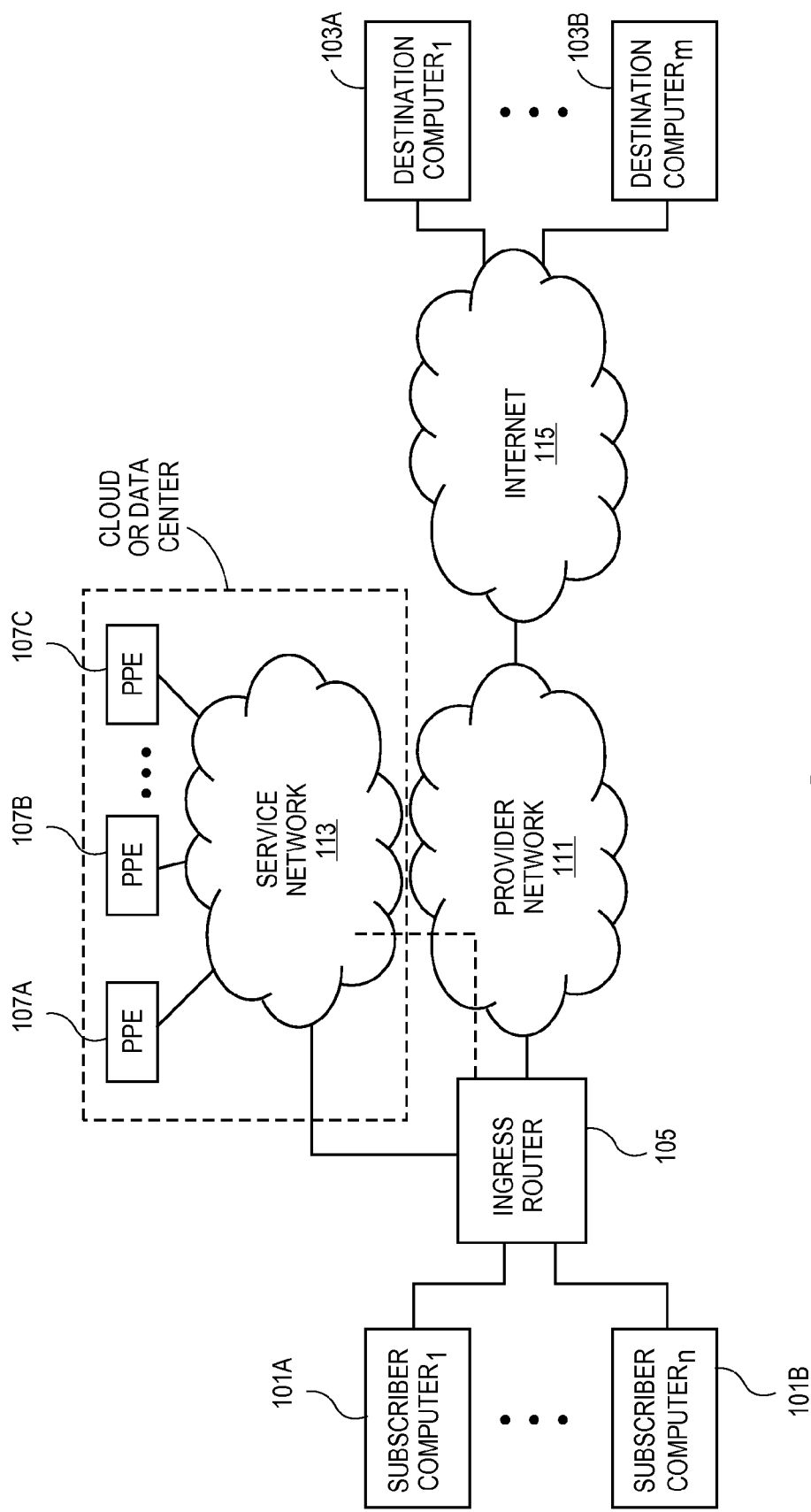
FIG. 1 is a diagram illustrating one embodiment of a network implementing load balanced service chains.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The operations of the various flow charts as illustrated in the figures will be described with reference to the exemplary embodiments illustrated in the various diagrams as provided by figures. However, it should be understood that the operations of the flow charts can be performed by embodiments of the invention other than those discussed with reference to the diagrams, and the embodiments discussed with reference to the diagrams can perform operations different than those discussed with reference to the flow charts. As may be appreciated, embodiments of the invention are not limited to the examples illustrated in the figures.

The techniques shown in the figures can be implemented using code and data stored and executed on one or more electronic devices (e.g., an end station, a network element, etc.). Such electronic devices may store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more buses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a method and system for avoiding the disadvantages of the prior art. The disadvantages of the prior art are that use of complex and/or stateful load balancers between PPE stages of a service network or single load balancing at an ingress router are inefficient in their use of resources.

The embodiments overcome the disadvantages of the prior art by the processes and structures described herein below. In some embodiments, the processes and structures are combined with the load balancing table management as described in U.S. patent application Ser. No. 13/346,474 and U.S. patent application Ser. No. 13/091,066. The embodiments operate by programming a set of fabrics (e.g., an Ethernet switch) between each set of PPEs that form stages of the set of service chains. In one embodiment, the programming of the fabric is by self-selection of a value or set of values linked with a particular services chain such as a flow hash used. This self-selection process executed by the PPEs is for the purposes of load balancing. In one embodiment, the flow hash or similar values linked with a service chain is encoded in the destination media access control (DA MAC) of the frames forwarded by the ingress router such that a receiver (i.e., a PPE) can self-select frames to process. The process also establishes bi-direction communication using the service chain identification values. In one embodiment, the process forces Ethernet MAC learning to cause the fabric (i.e., Ethernet switching hardware) to explicitly direct specific flow hash values to itself and not broadcast or flood frames to the set of load spread PPEs. In this embodiment, if the flow hash is generated such that both directions of traffic resolve to the same flow hash value, the packet processing element will self-select for both directions of traffic flow through the overall service network. The self-selection process is combined with the table based load spreading mechanism described in U.S. patent application Ser. No. 13/346,474 implemented by the receiving packet processing element as the self-selection criteria such that failures and restorations in the set of load spread packet processing elements causes a minimum of re-routing of traffic through the overall packet processing service network. In one embodiment, a distributed database mechanism is used to synchronize the table transitions in the set of load spreading packet processing elements to permit deployment of additional capacity in the form of more packet processing elements, or the graceful decommissioning of packet processing elements.

The embodiments permit per hop load spreading to be implemented without specialized hardware (i.e., existing switching fabric, such as Ethernet switches can be utilized without modification), and concentrates all functionality associated with the scaling of a set of packet processing elements in the set of elements themselves with the exception of the assignment of the service chain identification value (e.g., a flow hash is encoded in a DA MAC), so all provisioning associated with addition, movement and changes to the set of packet processing elements is associated with the packet processing elements themselves and is completely decoupled from the surrounding elements such as the switching fabric hardware elements. The embodiments permits graceful expansion or contraction of capacity of any given set of packet processing elements and minimizes the impact of failures on stateful flow processing. The process not only permits the intermediate packet processing elements to in a service chain to scale without degradation of bandwidth or packet processing capability at each stage, but also permits the set of ingress and egress devices to/from the service network to similarly scale.

The embodiments provide a load spreading mechanism for multiple stages of packet processing elements such that a given flow will always traverse the same set of packet processing elements in both directions in a stable environment and the given flow will tend to continue to traverse the same set of surviving packet processing elements when failures occur. The load spreading mechanism also provides a method for adding or removing packet processing elements to any stage of packet processing with minimum impact on existing flows. The load spreading mechanism provides that any reverse direction traffic associated with the flow will traverse the same set of packet processing elements.

It should be noted that the examples provided herein are primarily directed to uses of the method and architecture at network elements within larger networks 'middle boxes,' at edges of networks and in similar locations throughout a larger network infrastructure. However, the process and structures can also be applied at terminating or end devices to perform relevant packet processing at those locations. One skilled in the art would understand that the principles and structures described herein below would equally apply to such terminating or end devices.

In addition, in some embodiments operations administration and management (OAM) flows can be created consistent with the processes and structures discussed herein below to test a given service chain data flow identifier value by duplicating a data flow identifier in an OAM frame injected at the ingress and only require the PPEs to transparently relay or terminate or respond to these frames that include an appropriate indication (e.g. Ethertype or multi-protocol label switching tunneling protocol (MPLS-TP) associated channel (ACH)) that permits an OAM frame to be differentiated from customer payload. In this embodiment, the egress also needs to terminate or respond to the OAM flows. This OAM frame support provides testability and service assurance for the service networks implementing the process and structures described herein.

Network Element Architecture

FIG. 1 is a diagram illustrating one embodiment of a network implementing load balanced service chains. In one embodiment, the network includes a provider network 111, a service network 113, a wide area network 115 and a set of computing devices 101A-C, 103A-C connected to these networks and communicating over these networks. In other embodiments, any configuration and number of networks and computing devices can be interconnected such that a service network 113 is included to facilitate processing of packets for a node or set of nodes in these networks. The example is provided by way of illustration rather than limitation. One skilled in the art would understand that the service network 113 can service any node by offloading data packet or frame processing.

The computing devices 101A-C, 103A-C can be any type of computing devices such as user equipment (e.g., desktop computers, mobile devices, console devices and similar computing devices), servers, or similar computing devices. The computing devices 101A-C can subscribe to the services of an Internet service provider (ISP) or similar data network that provides access to remote computing systems illustrated as destination computers 103A-C. The access to these remote resources can be via provider network 111, which can provide direct or indirect access to these resources that can be directly attached to the provider network or the provider network can provide access to the remote resources by proving internet access 115.

Access to the provider network 111 can be provided through an ingress router 105 or set of ingress routers, which are edge devices of the provider network 111. In other embodiments, other types of network elements such as bridges can also implement this functionality. For sake of clarity, the examples are primarily directed to routers. However, one skilled in the art would understand that other network elements can also implement the processes described herein. The ingress router 105 can be the point where a number of services are initiated for the arriving packets that are to traverse the provider network 111. Examples of services, can be level 3 and level 4 routing, firewall, network address translation (NAT), header augmentation, tunneling, virtual private network services, virtual local area network services, multicast and similar packet processing services. Implementing these services at the ingress router 105 can be resource intensive causing decreased performance or the use of more expensive high resource equipment to serve as ingress routers 1110. The ingress router 105 can offload the packet processing to a service network 113 that can be a set of local network devices, a data center, a cloud computing system or similar resources in communication with the ingress router 1110.

The service network 113 can provide a set of packet processing elements (PPEs) 1115 that each perform some of the packet processing functions for the data traffic traversing the provider network 111. Sets of PPEs 107A-C can provide different packet processing functions. Those PPEs that perform the same function can be referred to as a stage of the service network. An ingress router 105 or similar device can determine a route for incoming packets to traverse (i.e., an ordered set of PPEs). The route can be referred to as a service chain and can be specific to a customer, or a set of particular packet flows. Service chains can be implemented as virtual local area networks (VLANs). Multiple service chains having the same order and constituent PPEs can be considered separate instance of a service chain servicing different data flows. While these service chains are similar or identical they are tied to separate VLANs or similar structures. A service chain can include any number or order of PPEs. Where there are more than one of a particular type of PPE (i.e., that perform the same packet processing function) for the purposes of scale and/or resiliency, then a service chain can utilize any equivalent PPE in a set of equivalent PPEs that form a stage of the service chain. A service chain can be identified by any value that is unique to the service chain, such as VLAN identifier, a tuple of PPE identifiers, ccja hash of header information in the data flow and similar data, sets of data or combinations of data that can identify a data flow traversing a service chain.

In one embodiment, the results of the packet processing elements in a service chain are returned to the ingress router to be forwarded toward their destination. In other embodiments, the results of the packet processing elements can be to an egress router of the provider network 111. The processes and structures described herein provide a more resilient and resource efficient method for managing the addition, loss or failure and reconfiguration of the PPEs in the service network to minimize the impact on the data flows being processed by the service network.

Figure 2:
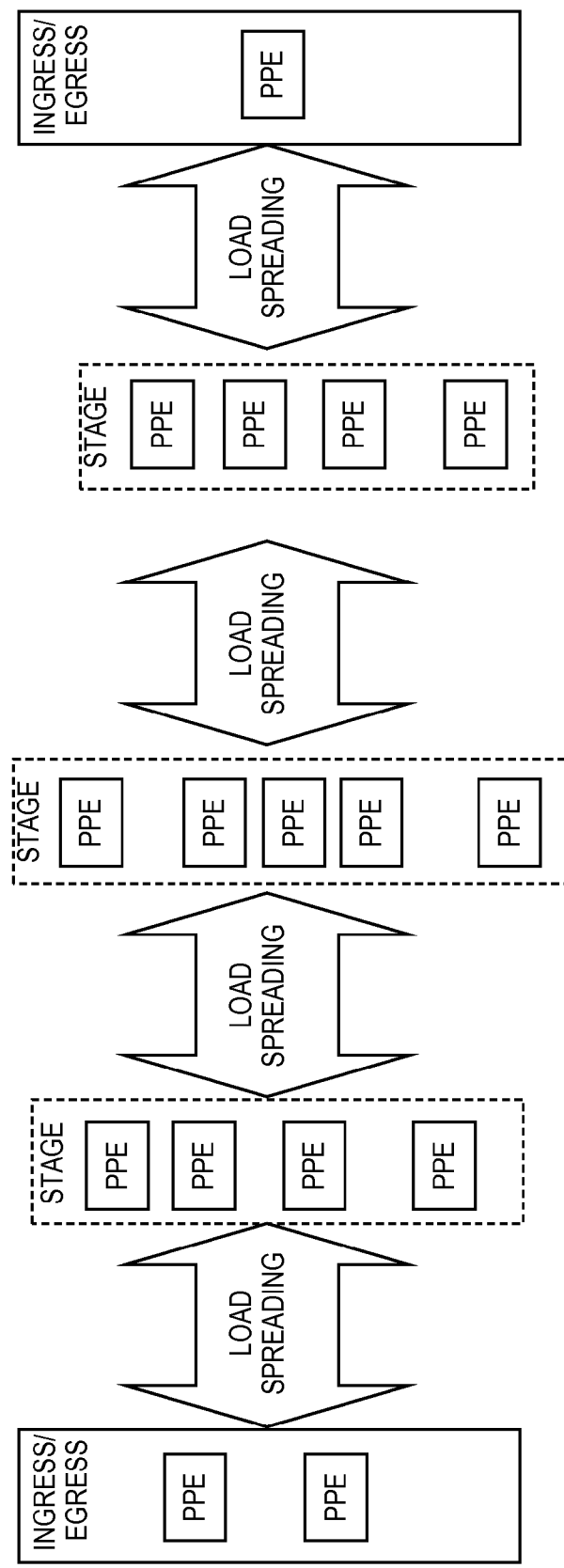
FIG. 2 is a diagram illustrating one embodiment of load balancing across stages of a service network.

FIG. 2 is a diagram illustrating one embodiment of load balancing across stages of a service network. The diagram shows the communication of data frames across a set of stages for a service. Each of the PPEs in a given stage perform the same set of functions. The stages correspond to a particular service chain or set of identical or similar service chains. Any single service chain will at any one time include one PPE from each stage. Other service chains can have other configurations of the PPEs in different stages. The PPEs at each end of the service chain can be referred to as ingress and/or egress PPEs and in some embodiments are implemented by an ingress and/or egress router as discussed herein below. The representation is a logical/virtual representation as some stages of PPEs may appear in one service chain but not in another one. The virtualization of connectivity between PPE stages permits this.

Load spreading can occur between each stage or between stages and separate or individual PPEs. The load spreading comes in the form of distributing the use of PPEs across the set of identical or similar service chains. As new PPEs are added to a stage or PPEs are removed from a stage the load balancing is reconfigured to attempt to keep the load even amongst the new configuration of PPEs in a given stage. A process for graceful transition in response to new PPEs or the loss of PPEs in any stage is described further herein below.

Ingress Router

Figure 3:
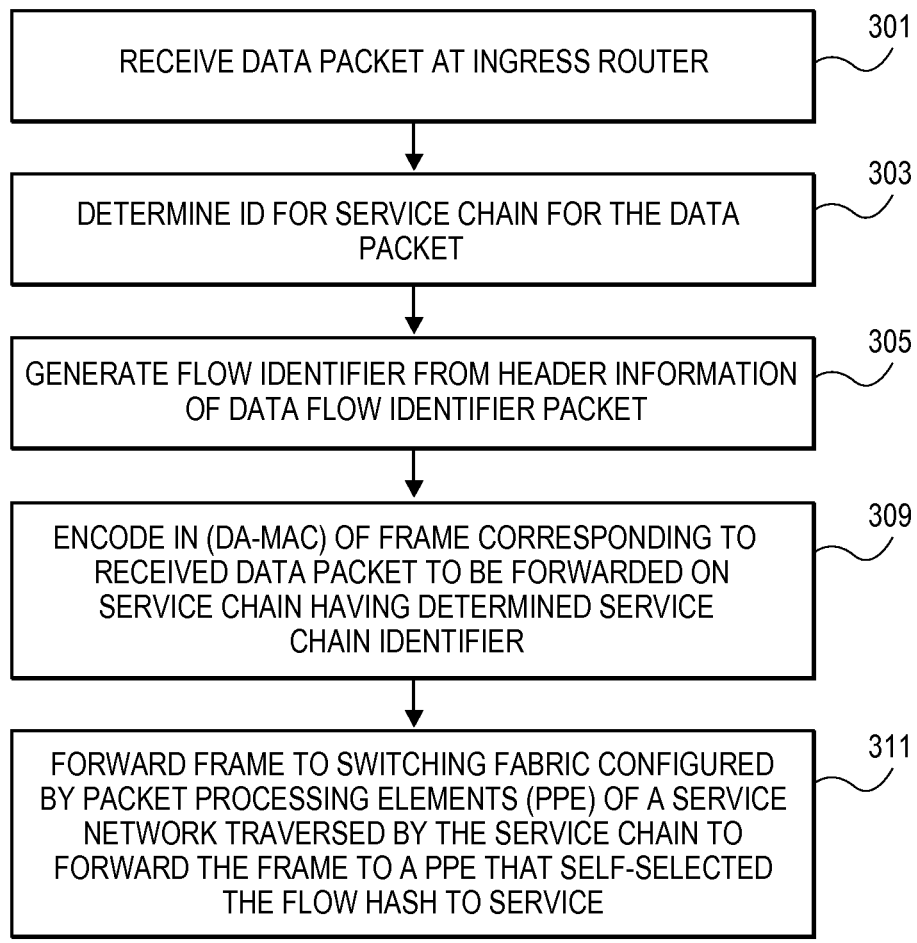
FIG. 3 is a flowchart illustrating one embodiment of a process for generating a service chain identifier at an ingress router.

FIG. 3 is a flowchart illustrating one embodiment of a process for generating a service chain identifier at an ingress router. The ingress router receives a data flow from a source computer such as a subscriber computer or similar computing device. The data flow has a destination that is within or across the provider network. The ingress router has the responsibility of matching the data flow with a service chain implementation such as a VLAN or similar implementation of a service chain that is specific to the received data flow.

The process is initiated by receipt of a data packet at the ingress router (Block 301). The data packet can be part of a new flow or part of an existing data flow. The ingress router examines the data packet to determine an identifier for the service chain associated with the data packet (Block 303). The service chain that is appropriate for the data flow can be determined by the ingress router or can be determined remote from the ingress router based on the services that are required for the data flow.

To determine a data flow identifier, any subset of the header information can be utilized, a hashing algorithm can be applied to the header information, or a similar process can be applied to generate a value that is unique to the data flow such that it can be matched with a service chain that has been assigned to the data flow (Block 305). Where a hashing algorithm is utilized a flow hash can be generated that represents the data flow. Any hashing algorithm can be utilized to generate the flow hash such that the flow hash has a high certainty of uniquely identifying the data flow based on a hash of a subset of the header information of any packet in the data flow. In one embodiment, the data flow identifier can be embedded or encoded into the frame to be sent to the service chain in the service network (Block 307). The data flow identifier (e.g., a flow hash value) can be encoded within the destination media access control (DA MAC) of the frame. The flow hash value can then be utilized to identify the data flow by the PPEs in the associated service chain.

The frame is then forwarded to the switching fabric that has been programmed by the PPEs in the next stage (Block 309). As discussed further herein below, the PPEs in the next stage self-select which of the PPEs in the stage service a data flow using a data flow identifier or similar identifier to differentiate data flows assigned to the service chains such that they can be load balanced across the PPEs that are associated with the service chain.

In some embodiments, the L bit of the DA MAC address of frame being forwarded is set to indicate local significance of the destination address and will not conflict with manufacturer administered MAC addresses. In one embodiment, the data flow identifier generation is performed in a way to ensure both forward and reverse directions of a data flow are tied to the same value (e.g. identifiers can be sorted before performing the hash or similar process). The process requires that the VLANs used to be dedicated and independent VLAN learning (IVL) is utilized allowing that there will be duplicate MAC addresses as connectivity will be bi-directional at each stage. In this receiver (PPE) driven process the use of a symmetric data flow identifier (e.g., hash value) ensures individual service chains are symmetric. A separate VLAN in each direction for a data flow can be utilized to avoid collisions where algorithmically generated MAC addresses are in use, alternatively a direction bit could also be encoded in the DA-MAC to ensure uniqueness.

Service Chain Processing

Figure 4:
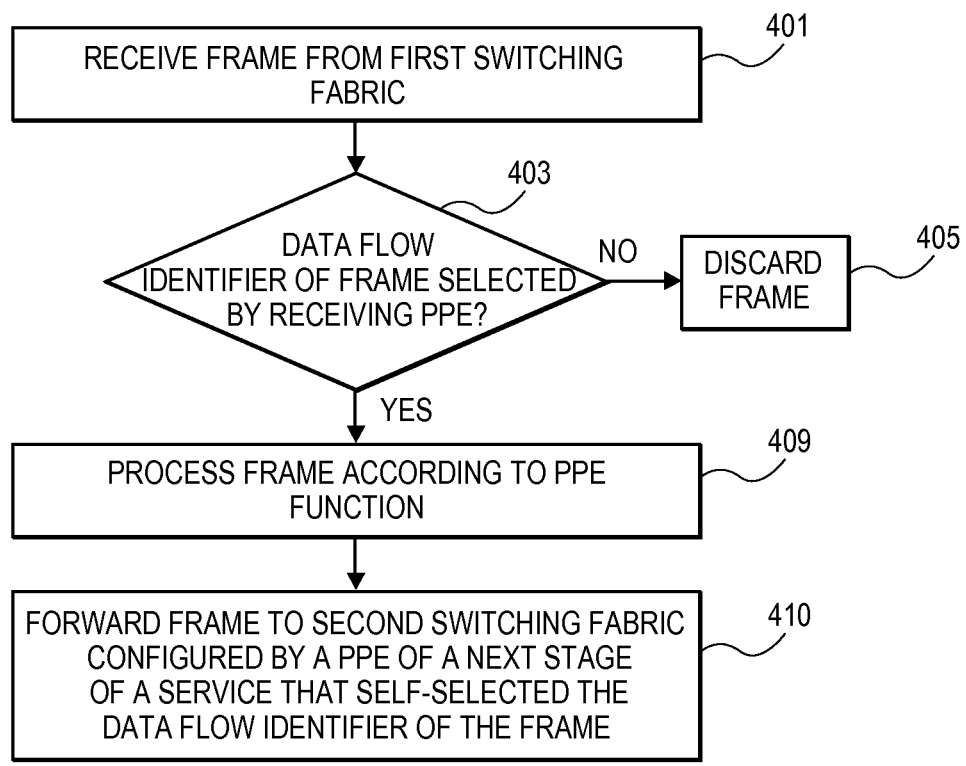
FIG. 4 is a flowchart illustrating one embodiment of a process for handling data traffic with an encoded flow hash.

FIG. 4 is a flowchart illustrating one embodiment of a process for handling data traffic with an encoded data flow identifier by a PPE. In one embodiment, the switch fabric forwards frames from the ingress router and/or previous stages of the service chain to a configured network element or port that is tied to a next PPE in the service chain. The PPEs in the next stage self-select the data flows that they will handle as described herein below. The illustrated process describes the handling of frames received over the switch fabric by the PPEs.

In one embodiment, the process is initiated in response to receiving a frame from a first switch fabric (Block 401). The frame can be received over any type of switch fabric such as an Ethernet switch, a set of Ethernet switches, or similar configurable switch fabric or interconnect. In one embodiment, the network element executing the PPE is connected to a single switch fabric through any number of ports or interfaces. In other embodiments, the network element executing the PPE is connected to multiple switching fabrics through different ports. A switching fabric can be an upstream or downstream switching fabric relative to the service chain.

The frame is examined to retrieve a data flow identifier, which is checked against the set of data flow identifiers that the PPE has self-selected to service (Block 403). In one embodiment, the data flow identifier can be a flow hash or similar identifier embedded in a field of the frame such as the DA MAC of the frame. In cases where the data flow identifier was not self-selected by the PPE, the frame can be discarded (Block 405). This prevents redundant processing of the same frame across multiple PPEs in the same stage of a service chain in scenarios where a broadcast medium is used as a fabric, or a forwarding entry has aged out in a switching fabric. In some embodiments, the PPE can then configure the switching fabric not to send frames with the received data flow identifier or notify the PPE that is determined to service the data flow identifier. Using the shared load balancing algorithm and tables, described in U.S. patent application Ser. No. 13/346,474, the correct PPE can be identified. An adaptation of the load balancing tables is discussed further herein below.

Where the frame has been properly received, the frame can be processed according to the packet processing functions of the PPE (Block 409). Once completed the frame is forwarded to a second switching fabric configured by a PPE of the next stage of the service chain (Block 409). Via the use of symmetric VLAN translation (well understood by those in the art) the plurality of switches between stages can be implemented as a common switching fabric, such as where the PPEs at successive stages of the service chain are all joined by the same hardware switch. Also, the PPE can be located at the end of the service chain and the frame can then be forwarded back toward the ingress router. During the forwarding process PPEs preserve the encoding of the data flow identifier and the service chain identifier (e.g., a flow hash and VID) information associated with each frame with the switch ensuring that the forwarding database (FDB) associated with each stage is unique via VLAN translation.

Figure 5:
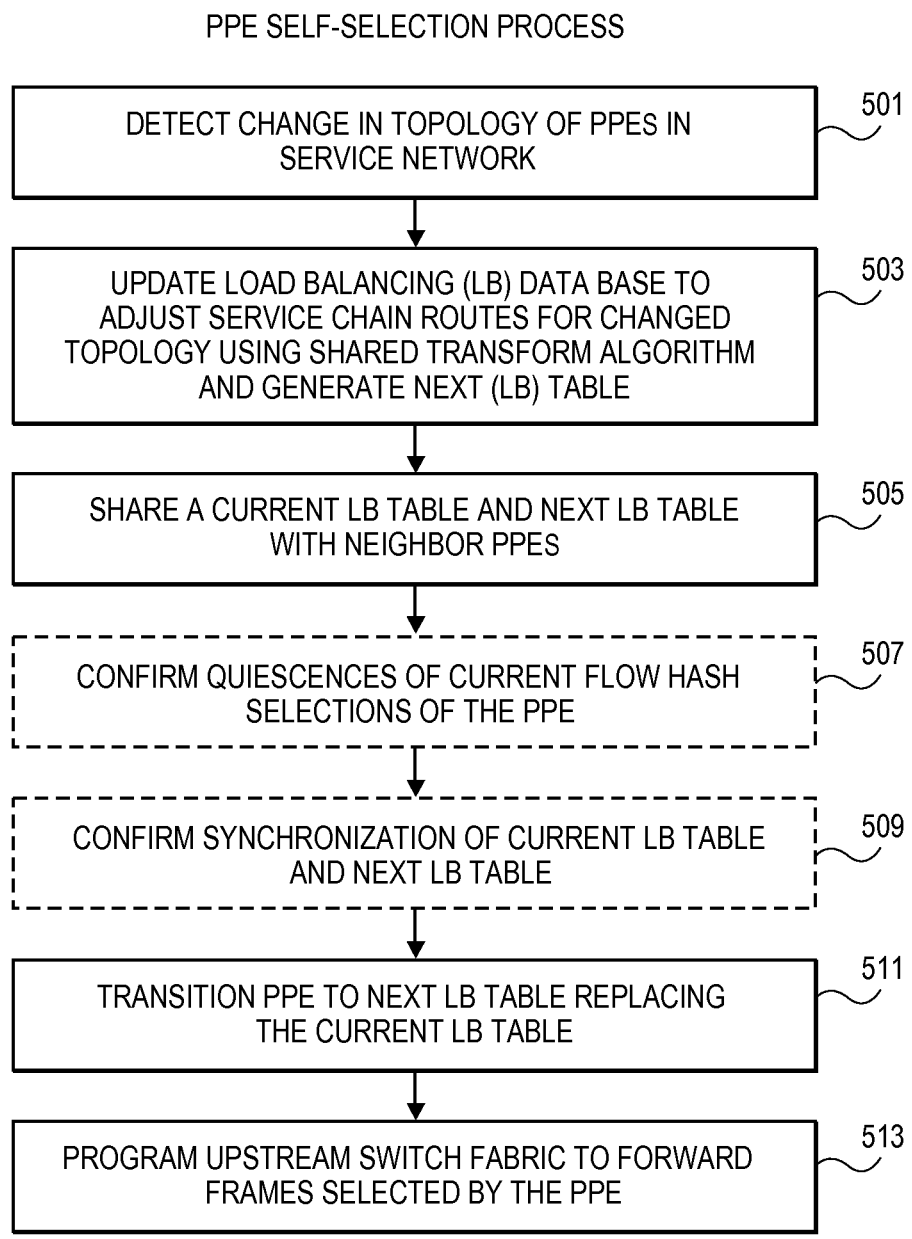
FIG. 5 is a flowchart illustrating one embodiment of a self-selection process for a PPE.

FIG. 5 is a flowchart illustrating one embodiment of a self-selection process for a PPE. In each stage of a given service chain, the PPEs implement a self-selection process where they program the switch fabric to forward those data flows using the service chain to the respective PPEs according to a shared load balancing algorithm that generates a load balancing table for spreading the load between PPEs in a service network on a stage by stage basis.

In one embodiment, the process can be initiated in response to detecting a change in the topology of the service network or more precisely the PPEs in the service network or in a particular service chain (Block 501). The PPEs each update a local load balancing table to adjust the routes of service chains for the change in topology using a shared load balancing algorithm (i.e., a shared transform algorithm). The update results in the generation of a new load balancing (LB) table (Block 503). Each PPE detects the same change and calculates the next LB table independently and in parallel with the same result. The process of generating the LB table is described in U.S. patent application Ser. No. 13/346,474. The new (i.e., "next") LB table and the current LB table are shared with the other PPEs in a given stage or throughout the service network (Block 505). In some embodiments, these tables are shared by sending the complete tables to the other PPEs or by sending a digest, hash or similar unique or near unique identifier of the current and next LB tables. The LB tables can be sent to all PPEs or just to neighbor PPEs. All LB tables that are received from other PPEs can be compared to those that were locally generated. Where digest or hash information is exchanged, then these values can be compared.

In one embodiment, a "new" PPE needs to generate a "current" table assuming it does not exist in order to synch with neighbors, and a "next" needs to be generated assuming it does. In some cases multiple simultaneous changes could be problematic, or simply updates would stop until every PPE reconverged on a new view of the "next" load balancing table and the incremental transition procedures are started over again. A PPE that owns a data flow identifier (e.g., hash value) in the "current" table is the only one allowed to update ownership of it.

The PPE also tracks activity for each of the data flows currently being serviced and particularly those that are affected by the recalculated LB tables. The PPE can seek to detect whether the data flow is quiescent and in condition to reassign or configure the data flow load balancing (Block 507). When the PPE deems the data flow quiescent it can advertise relinquishing ownership of the bucket such that the designated owner in the "next" table can take it over Where the affected data flows are quiescent and all other PPE or all neighbor PPE LB tables (current and next) are synchronized (i.e., the current LB tables are identical to one another and the next LB tables are identical to one another) (Block 509), the transition from the use of the current LB table to the next LB table can be implemented by replacing the current LB table with the next LB table (Block 511). This transition is executed by each of the PPEs in parallel such that after the completion of the transition all of the PPEs are utilizing the same current LB table.

With the updated current LB table in place the PPE programs the upstream switch fabric to forward those frames that are tied to data flows that have been self-selected by the PPE (Block 513). The programming can be implemented by any fabric programming interface. In one embodiment, the PPE generates gratuitous messages that are sent to the switch fabric providing a data flow identifier to be serviced by the PPE such that the switch fabric will only forward these data flows to the sending PPE. For example, the generation of a gratuitous message with a source address (SA) MAC corresponding to the data flow identifier encoded in the DA MAC address at the ingress to the service chain permits a PPE to program the forwarding tables of a traditional Ethernet bridge or switch for these MAC address values to direct frames received from either the ingress or a previous stage with the encoded data flow identifiers to itself (i.e., to the self-selecting PPE).

In one embodiment, a PPE that believes its LB database is synchronized with its neighbors will issue gratuitous messages in the reverse direction with the data flow identifier (e.g., hash values) it now owns encoded in the SA-MAC field. In other embodiments, the PPE programs or uses a configuration protocol of the switch fabric hardware to direct frames with the data flow identifiers associated with it in the LB table to itself.

In other embodiments, the process could be applied to other networking technologies. For example, the process could be implemented via a notice to a controller that modified a forwarding information base (FIB) in the intervening switch elements for those switch fabrics that do not do source learning. For example, the process can encode the data flow identifier (e.g., a hash) in a multi-protocol label switching (MPLS) label, and a central controller directs steering of the label to implement forwarding.

In cases where the PPE that owns a data flow identifier disappears, and the survivor PPEs in a stage agree on a next LB, the PPEs can independently assume ownership of those data flow identifiers that were owned by the failed PPE defined in the current LB table and owned by these PPEs in the next LB table." However, this creates several race conditions where the receiver may not receive a relinquish message (hence reliable delivery is required) and a data flow may start before the hardware is reprogrammed (which may be assisted by an XON/XOFF discipline).

Load Balancing Tables

The load balancing table generation and loading process or load balancing scheme of U.S. patent application Ser. No. 13/346,474 and utilized herein handles a topology change in the network that results in a change in the number of PPEs available in a given stage of a service chain.

There are two aspects of this process, load balancing table generation and table loading. The process first constructs a set of load balancing lookup tables such that the impact of changing from using one load balancing table to using another load balancing table is minimized. Separate load balancing tables are used for N, N+1 and N−1 possible PPE configurations in a service chain. N as used herein can represent any positive integer value. Thus, changing the number of available PPEs requires changing the load balancing table used to determine a data flow identifier for a next hop in a service chain. The process then updates the selected load balancing table for a service chain or service network when a new PPE is added or an existing PPE is rendered unusable for the service chain. U.S. patent application Ser. No. 13/346,474 describes the load balancing process in relation to changes in network interfaces over equal cost paths, however, one skilled in the art would understand that this is also applicable to generation of load balancing tables that apply to PPE availability as a substitute for network interface availability.

Figure 6:
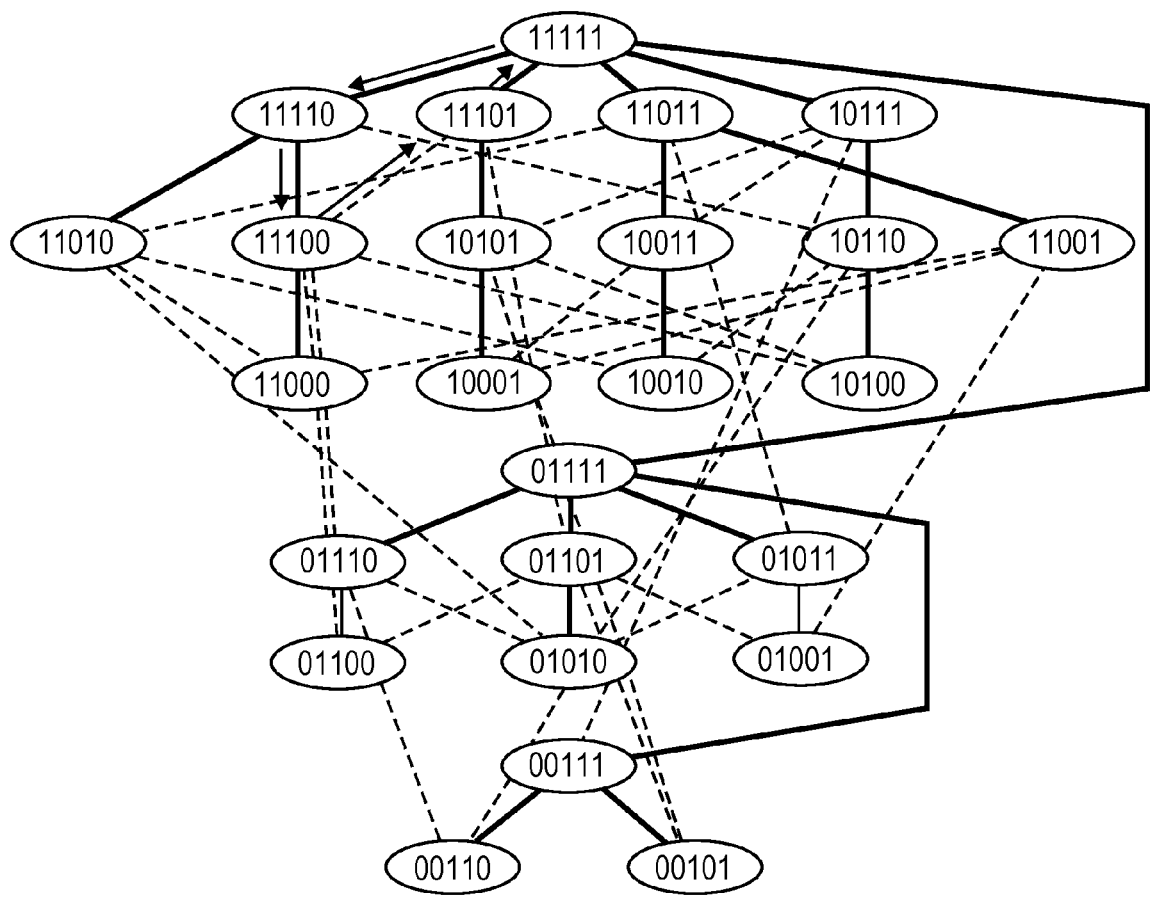
FIG. 6 is a diagram of one embodiment of a graph of the possible states of PPEs in a stage of a service chain.

FIG. 6 is a diagram of one embodiment of a graph of the possible states of PPEs in a stage of a service chain. In the example, the possible changes in the topology of the service network are shown or more particularly the changes in the possible PPEs. Each of the transitions requires the recalculation of the load balancing tables. The numbers in each node of the topology indicate the availability of PPEs in a given stage of a service chain (logical bit map). Dotted lines in the graph represent transitions where there is a significant disruption in the distribution of flows and thus the transition is disfavored and the solid lines indicate minimal disruption and thus are preferred transitions. The arrows in the example show an example where node (e.g., a PPE) 5 fails, then the next arrow transitions to a state where node 4 fails, subsequently node 5 recovers and then node 4 recovers to return to the original state. The process can administratively control the order of recovery of PPEs, such that the order is the exact reverse of the failure sequence, and therefore in such multiple failure scenarios favorable minimally disruptive transitions can be utilized.

Figure 7A:
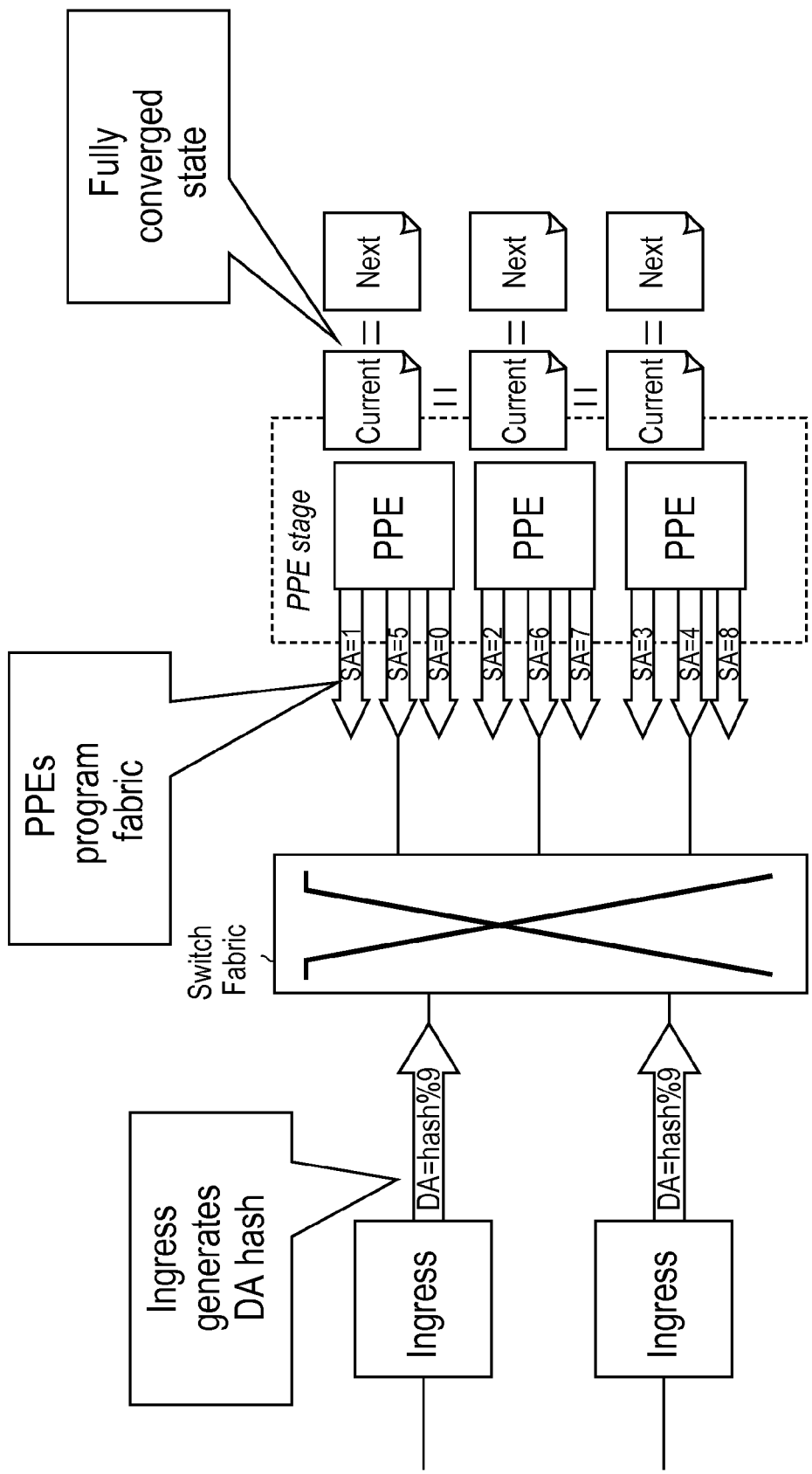
FIG. 7A is a diagram illustrating one embodiment of a service network fully converged.

FIG. 7A is a diagram illustrating one embodiment of a service network fully converged. In this example, the data flow identifier is implemented by use of a flow hash that is encoded in the DA MAC at the ingress routers. In the example, a hash % 9 value (i.e., a hash value derived from an integer modulo 9 function) is encoded in a message and sent to the switch fabric. The switch fabric has been programmed by or has learned from the PPEs in the next stage of a service chain, which PPEs are servicing specific data flow identifiers. In this example, these data flow identifiers are provided by messages with SA MAC fields encoded by the self-selected PPEs.

Each of the PPEs also maintains a current LB table that describes the distribution of data flows for each service chain across the available PPEs in a stage. All of the PPEs independent generate the current LB table and maintain it. While all of PPEs are utilizing the current LB table the system is in a fully converged state. Where a change to the available PPEs occur a next LB table is generated.

Figure 7B:
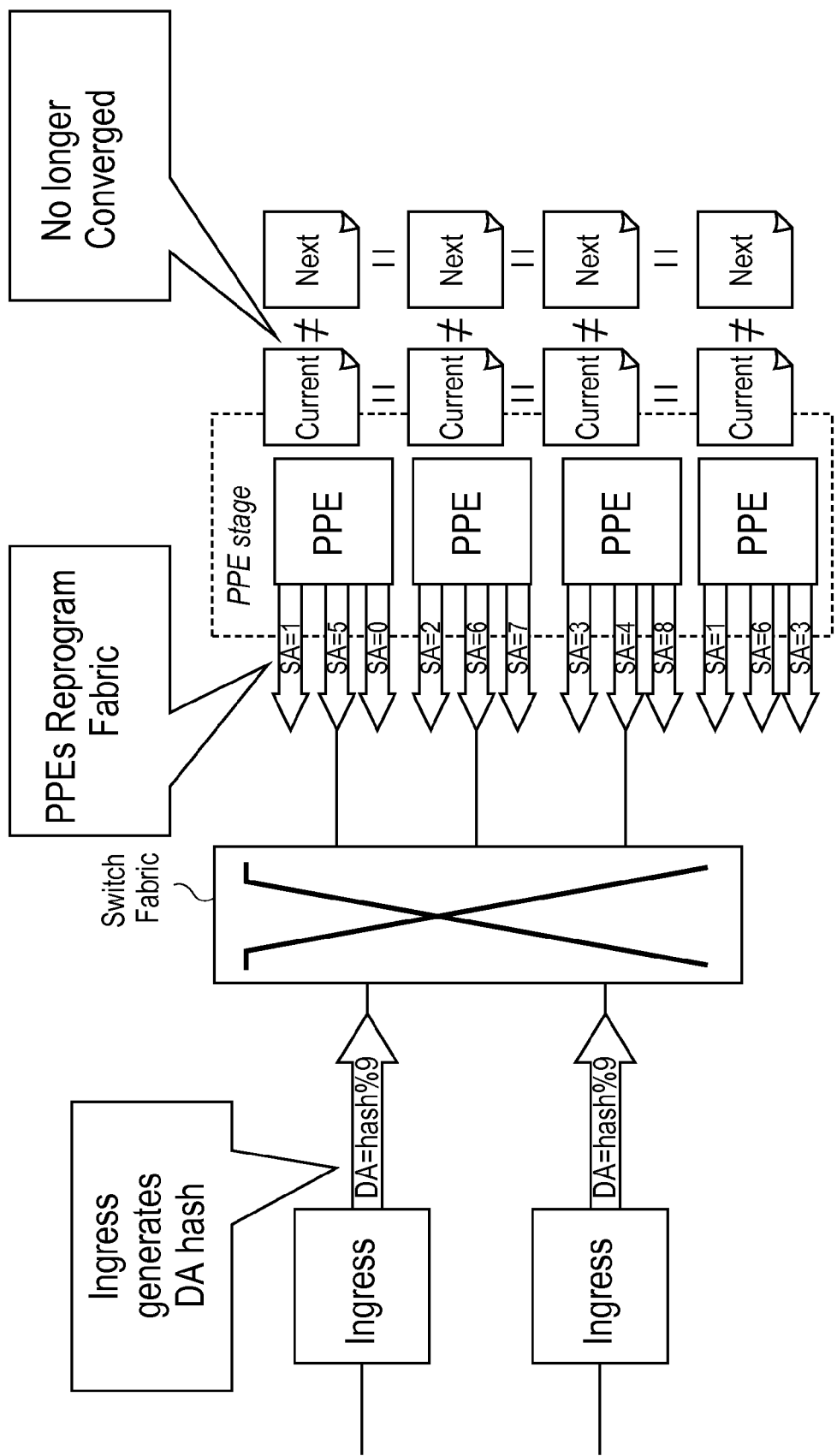
FIG. 7B is a diagram illustrating one embodiment of a service network during reconvergence.

FIG. 7B is a diagram illustrating one embodiment of a service network during reconvergence. In this example, a new PPE has been added to a stage of the service chain. The ingress routers continue to function in the same manner encoding a data flow identifier (e.g., a flow hash) in the frames sent to the switch fabric and the PPEs continue to program the switch fabric with configuration messages or gratuitous messages with SA MAC addresses encoding the self-selected data flow identifiers. The system is not in a fully converged state. A set of next LB tables have been generated that represent the new topology of the service chain with the fourth PPE in this stage of the example. Data flow identifiers have been reassigned to the new PPE, in the example 1, 6 and 3 are assigned to the new PPE. The new PPE configures the switch fabric and the old PPEs will stop servicing these data flows upon reconvergence after the data flows are quiescent and the current LB tables can be updated by replacement with the next LB tables.

Figure 7C:
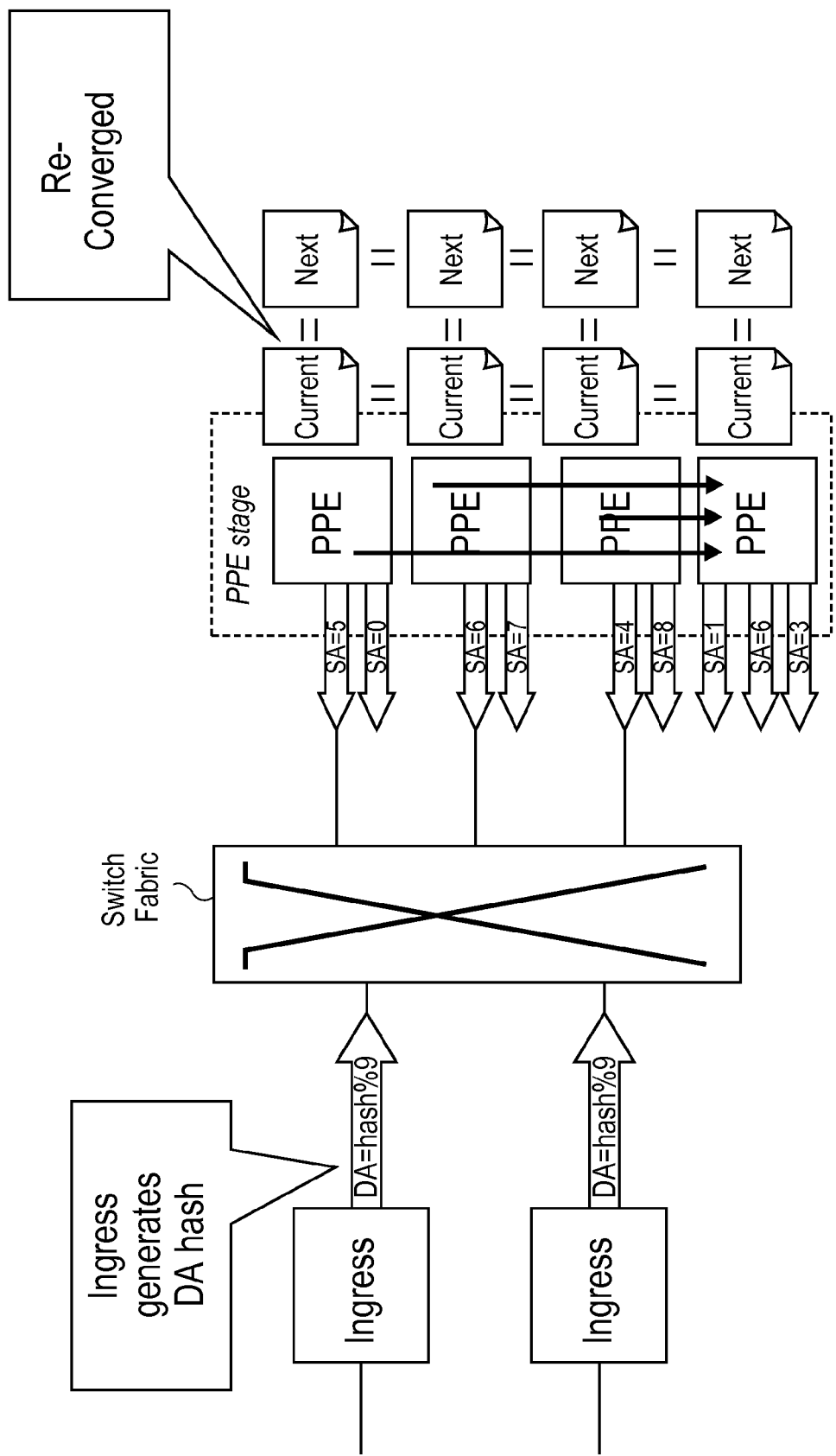
FIG. 7C is a diagram illustrating one embodiment of a service network after reconvergence.

FIG. 7C is a diagram illustrating one embodiment of a service network after reconvergence. In this example, the new PPE has successfully been added with the redistributed data flows with data flow identifiers 1, 6 and 3. The current and next LB tables are now equal returning the service network to a fully converged state. The ingress routers continue to function in the same manner encoding the data flow identifier (e.g., a flow hash) in the frames sent to the switch fabric and the PPEs continue to program the switch fabric with configuration messages or gratuitous messages with SA MAC addresses encoding the self-selected data flow identifiers.

Figure 8:
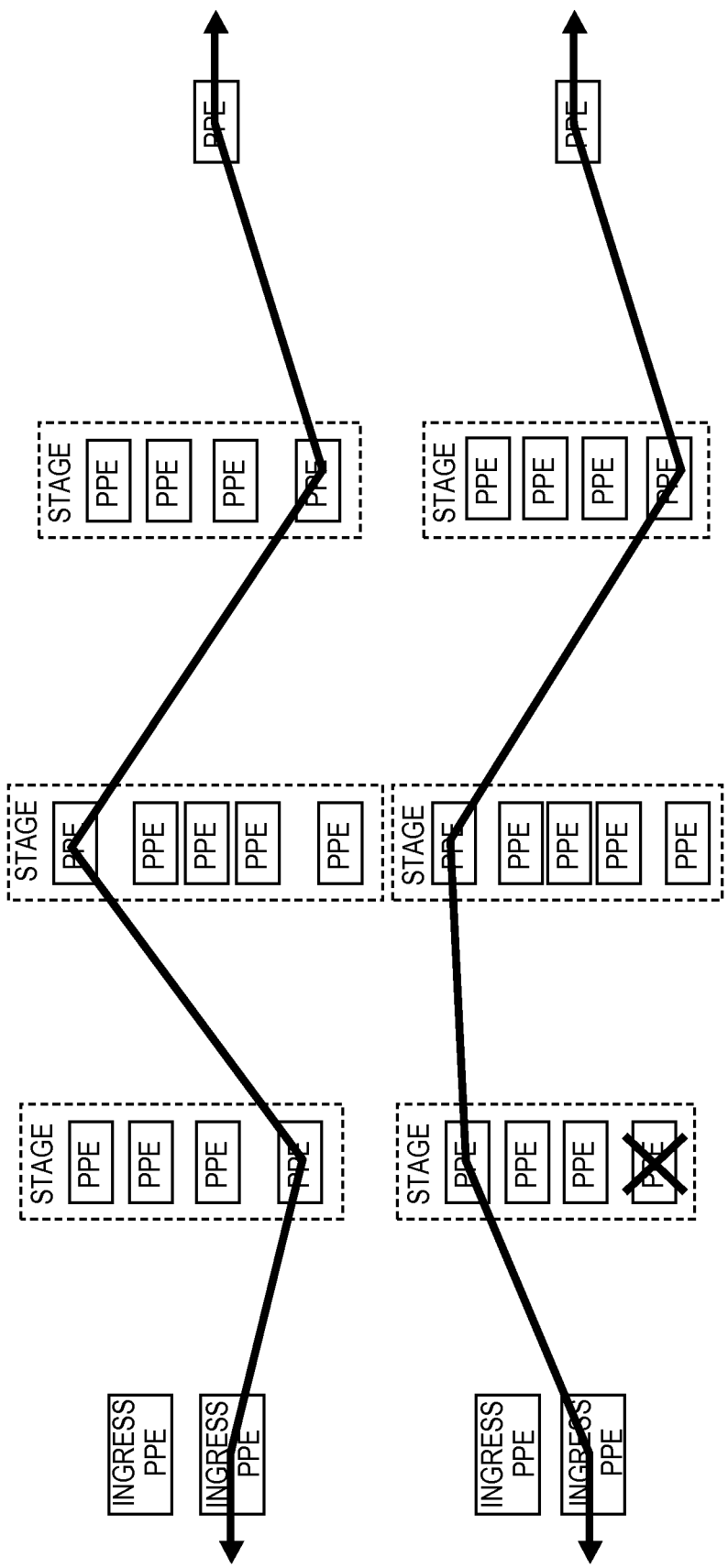
FIG. 8 is a diagram of one embodiment of a PPE failure in a service network.

FIG. 8 is a diagram of one embodiment of a PPE failure in a service network. This example shows a rerouting of a dataflow in response to the failure of one of the PPEs in its instance of the service chain. The top path shows the initial configuration of the service chain with four functioning PPEs in the first stage of the service chain. However, the PPE in this first stage servicing the data flow fails as shown in the bottom illustration. The process redistributes the load within the stage where the failure occurs, but the other stages of service chain are undisturbed by the reconfiguration process. This improves the efficiency of the transition, because the state information of only the stage with the failure is impacted. The PPE functions can be stateful and rerouting all of the stages of the service chain would cause considerable overhead in maintaining the state associated with the data flow for all of the stages, instead only the stage with the failed PPE is impacted.

Figure 9:
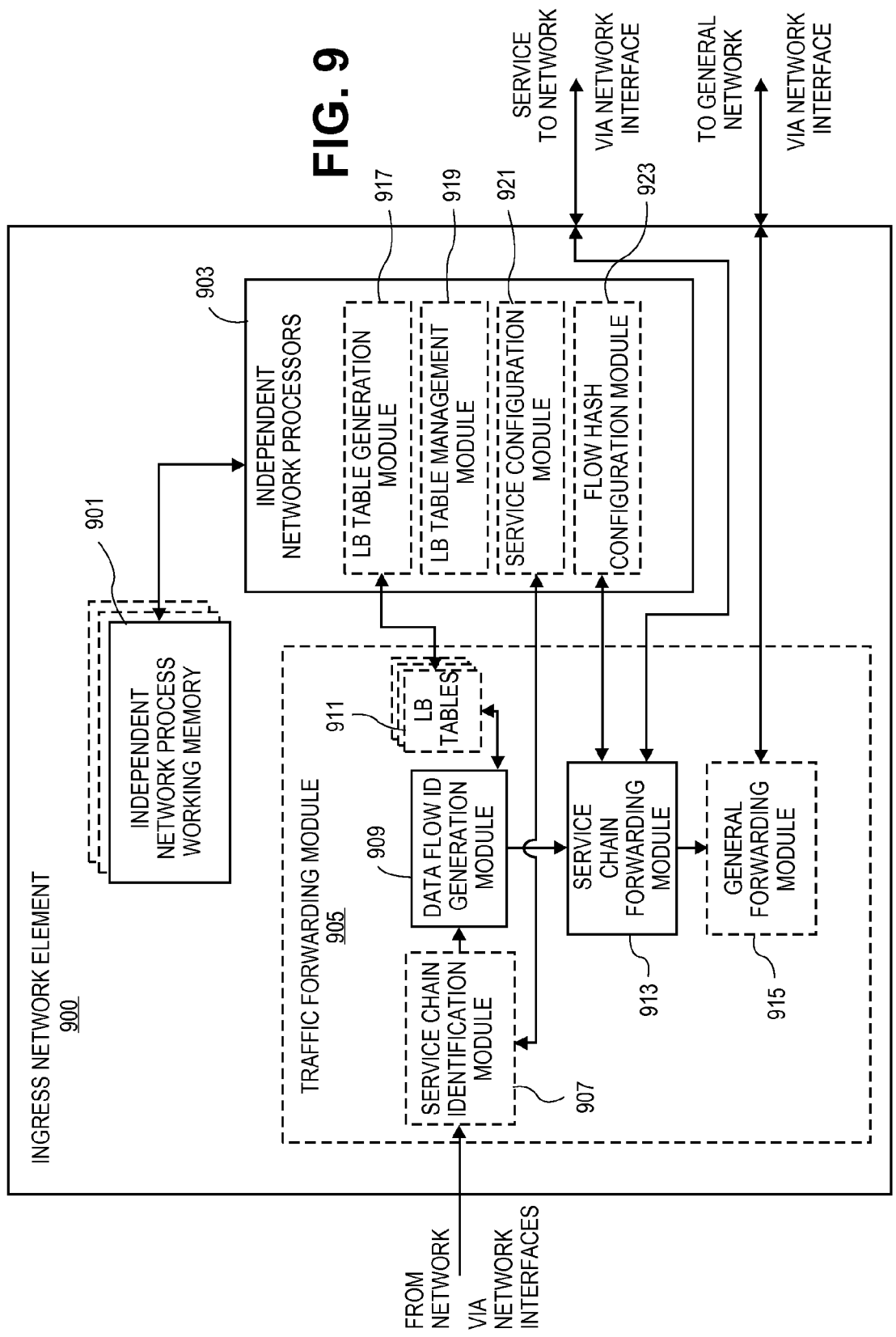
FIG. 9 is a diagram of one embodiment of an ingress router.

FIG. 9 is a diagram of one embodiment of an ingress router. The network element includes a set of network processors 903, a set of network processor working memory devices 901, and a traffic forwarding module 905. In some embodiments, the traffic forwarding module 905 can be a discrete component or can be implemented by a network processor 903. A set,' as used herein may refer to any positive whole number of items including one item. Each of these components of the network element 900 can be co-located or integrated with one another in any combination and at any level from an integrated circuit to the entire network element or even multiple network elements.

Data packets can be received via a network interface at a service chain identification module 907. The service chain identification module 907 can include a storage device for storing incoming packets received on any network interface that are to be processed by the set of network processors 903. The inbound storage structure can have any size or storage capacity.

The data packets can be initially examined to determine which service chain is applicable by identifying the associated service chain identifier at the service chain identification module 907. The service chain identification module 907 can be configured by a service configuration module 921 or similar component of the network element executed by the network processors 903.

After the service chain has been identified, the data flow identifier for the incoming packet can be generated by the data flow identifier generation module 909. The data flow identifier generation module 909 can use any information within the header of the received data packet and any shared hashing algorithm to calculate the data flow identifier. This data flow identifier can be compared with the load balancing tables 911 to determine a next hop in the form of a fabric switch to which a frame including the data packet or the portions of the data packet to be processed. A data flow configuration module 923 can configure the set of data that is processed and the type of algorithm and the parameters The LB tables 911 are optional and do not have to be generated at the ingress network element 900 where other receiver driven load balancing schemes may be employed. The LB tables 911 can be generated by a LB table generation module 917 and maintained by the LB table management module 919, which can constantly update the information related to the LB tables 911.

A service chain forwarding module 913 forwards the frame to the service network via a first switch fabric connecting the ingress router 900 with the first stage of the service chain. The service chain will return the processed data packet, which can then be forwarded toward its ultimate destination by a general forwarding module 915.

The network processor 903 or a set of network processors may execute a load balancing table generation module 917 to generate a set of load balancing tables to spread the load of data frames to be forwarded from the next hop set of PPEs and as such execute the same programming of the fabric as PPEs do (e.g. para 50). Any number of network processors 903 can be utilized in combination to generate the set of load balancing tables and other functions of the network element. One skilled in the art would understand that the processes and functions described herein can be divided across multiple network processors as well as multiple network platforms. For sake of clarity, an example with a single network processor 903 is described herein. The load balancing table management module 919 can monitor the number of available PPEs or similar topology information through the exchange of link state data or similar information, as well as the specific network interfaces available and adjust the current selected load balancing table accordingly.

The network processor 903 can utilize dedicated network processor working memory 901 to execute all the functionality of the network processor 903. Any type of random access memory and any amount of random access memory can be present within the network element 900 or external to the network element 900 for use by the network processor 903.

In one embodiment, the network processor 903 generates the set of load balancing tables in the working memory 901 to be stored in the load balancing table 911. Load balancing tables to be used by the network elements are loaded into the load balancing table memory after creation and population using the distribution mechanism.

Figure 10:
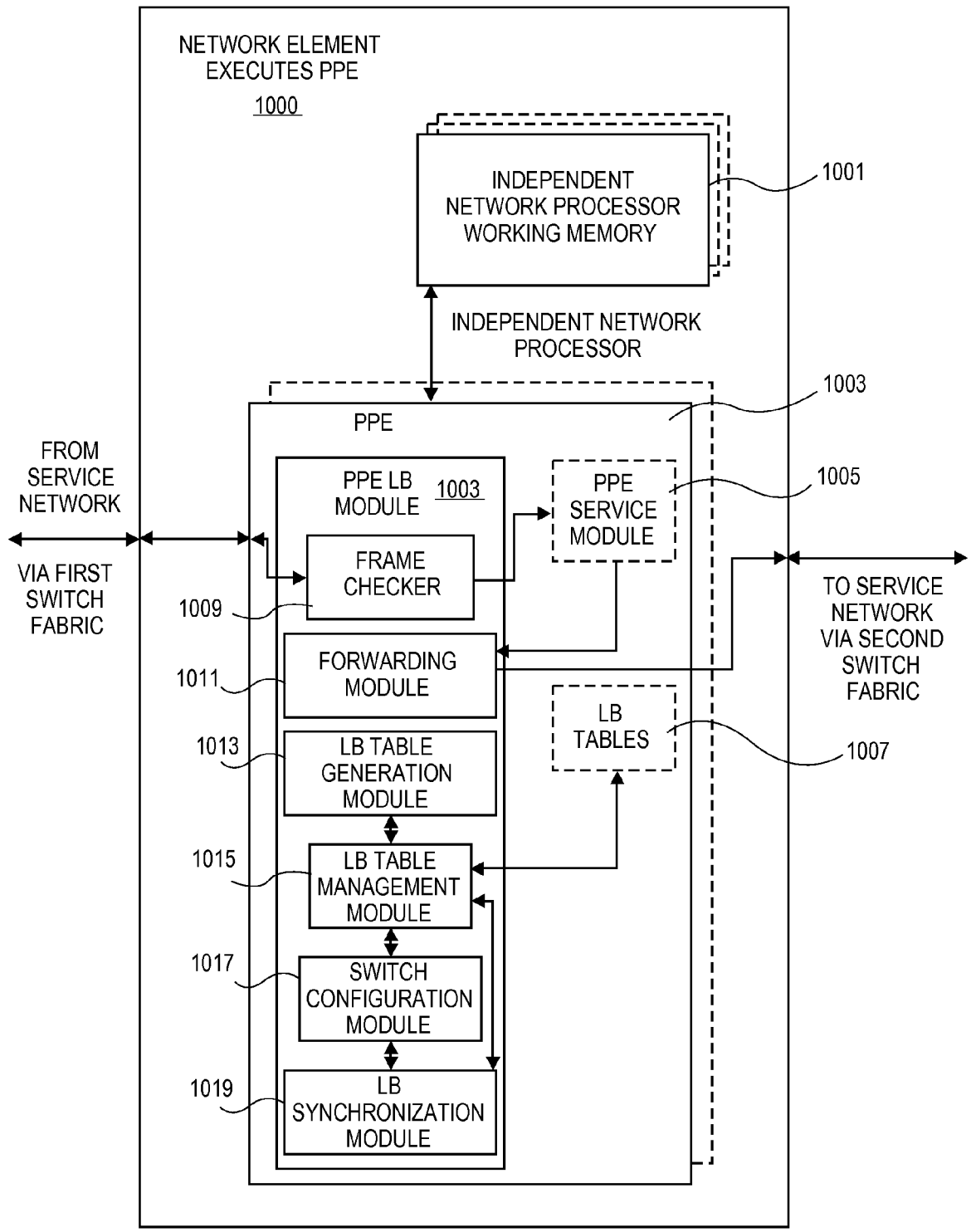
FIG. 10 is a diagram of one embodiment of a network element executing a set of PPEs.

FIG. 10 is a diagram of one embodiment of a network element executing a set of PPEs. The network element includes a set of network processors 1003 and a set of network processor working memory devices 1001. Each of these components of the network element 1000 can be co-located or integrated with one another in any combination and at any level from an integrated circuit to the entire network element or even multiple network elements.

The network processors 1003 execute a set of packet processing elements (PPEs) 1003. The PPEs 1003 can include a PPE load balancing (LB) module 1008, LB tables 1007 and a PPE service module 1005. The PPE service module 1005 executes any type of service or function on the content of the received data.

Data packets can be received via a network interface at a frame checker 1009 executed by the PPE. The frame checker 1009 can include a storage device for storing incoming packets received on any network interface that are to be processed by the set of network processors 903. The inbound storage structure can have any size or storage capacity.

The data frames can be initially examined to determine whether a data flow identifier within the received data frames has been self-selected by the PPE 1003. If so, then the frame checker can forward the received packet to the PPE service module 1005. If there is not a match of the data flow identifier with the PPE, then the data can be discarded.

After the PPE service has been executed, the data flow identifier and similar header information (e.g., VID) for the packet can be preserved by a forwarding module that then forwards the data frame toward a PPE in the next stage of the service chain.

The LB tables 1007 are generated and maintained by a LB table generation module 1011 and LB table management module 1015. The LB tables 1007 can be generated by the LB table generation module 1011 and maintained by the LB table management module 1015, which can constantly update the information related to the LB tables 911.

The network processor 9003 or a set of network processors may execute a load balancing table generation module 1011 to generate a set of load balancing tables to spread the load of data frames to be forwarded over the PPEs of the current stage of the service network. Any number of network processors executing PPEs 1003 can be utilized in combination to generate the set of load balancing tables and other functions of the network element. One skilled in the art would understand that the processes and functions described herein can be divided across multiple network processors. For sake of clarity, an example with a single network processor 1003 is described herein. The load balancing table management module 1015 can monitor the number of available PPEs or similar topology information through the exchange of link state data or similar information, as well as the specific network interfaces available and adjust the current selected load balancing table accordingly.

The network processor 1003 can utilize dedicated network processor working memory 1001 to execute all the functionality of the network processor 1003. Any type of random access memory and any amount of random access memory can be present within the network element 1000 or external to the network element 1000 for use by the network processor 1003.

In one embodiment, the network processor 1003 generates the set of load balancing tables in the working memory 1001 to be stored in the load balancing table 1007. Load balancing tables to be used by the network elements are loaded into the load balancing table memory after creation and population using the distribution mechanism.

A LB synchronization module 1019 can communicate with neighboring network elements in the service network that are executing PPEs with their own LB synchronization module to exchange LB table data such as a digest or hash of the current next LB tables when the available set of PPEs changes in stage of the service chain. When synchronization completes a switch configuration module 1017 can generate configuration messages or gratuitous messages (e.g., where IVL is implemented) for the configuration of the upstream switch fabric. The LB synchronization module 1019 and the switch configuration module 1017 coordinate to self-select a set of data flow identifiers to service for a given service chain. In one example embodiment, the switch configuration module generates a gratuitous message for the switch fabric that include the data flow identifier in the SA MAC.

The embodiments of the invention minimize packet discard in a given stage while preserving dynamic/elastic scaling and resiliency and minimize frame duplication in a given stage. A given stage always has one PPE assuming ownership of a data flow value. The process provide for hitless incremental shifting of load between PPEs for administrative changes. In this context, by hitless, it is meant that a shift of load balancing data flow values that are quiescent is performed. This process minimizes the impact of failures and ensures bi-direction return congruency at each stage.

In one embodiment, the system and methods described herein can be implemented as a set of hardware devices (e.g., within a network element). In another embodiment, the system components are implemented in software (for example microcode, assembly language or higher level languages). These software implementations can be stored on a non-transitory computer-readable medium. A non-transitory "computer-readable" medium can include any medium that can store information. Examples of the computer-readable medium include a read only memory (ROM), a floppy diskette, a CD Rom, a DVD, a flash memory, a hard drive, an optical disc or similar medium.

Thus, a method, system and apparatus for efficient way to manage network interface transitions for PDU forwarding and load spreading in a network element has been described. It is to be understood that the above description is intended to be illustrative and not restrictive. Many other embodiments will be apparent to those of skill in the art upon reading and understanding the above description. The scope of the invention should, therefore, be determined with reference to the appended es, along with the full scope of equivalents to which such claims are entitled.

What is claimed is:

1. A method implemented in a network device in a service network, the network device to execute a packet processing element (PPE) of a plurality of PPEs, where each PPE in the plurality of PPEs executes a stage of packet processing for the service network, where the plurality of PPEs are connected to one another by a plurality of switch fabrics, the PPE to self-select a subset of a set of equivalent service chains to service, each service chain defining a subset and sequence of the plurality of PPEs, the PPE to self-select the subset of equivalent service chains to process based upon knowledge of the plurality of PPEs servicing that stage of the set of service chains such that there is spreading of load across all available PPEs in that stage, there is no single point of failure and minimal reassignment of PPEs for a set of equivalent data flows traversing the plurality of PPEs of the service network from changes in topology of the plurality of PPEs in the service network, the method comprising:
   detecting a change in the topology of the plurality of PPEs;
   generating a next load balancing (LB) table to adjust service chain routes for the changed topology, the generating using a shared transform algorithm to replace a current LB table, the next LB table and the current LB table identifying next hops for all service chains in the service network;
   sharing the current LB table and the next LB table with the plurality of PPEs in the service network;
   transitioning the PPE to the next LB table by replacing the current LB table; and
   programming an upstream switch fabric to forward to the PPE a specific subset of frames selected by the PPE for processing according to the next LB table.

2. The method of claim 1, wherein the sharing of the current LB table and the next LB table comprises the steps of:
   generating a digest of the current LB table and the next LB table where the next LB table has been adjusted in accordance to a detected change, and
   broadcasting the digest to the plurality of PPEs.

3. The method of claim 1, further comprising the steps of:
   confirming quiescence of current flow hash selections of the PPE before the transitioning to the next LB table.

4. The method of claim 1, further comprising the steps of:
   confirming synchronization of the current LB table and the next LB table amongst the plurality of PPEs before transitioning to the next LB table.

5. The method of claim 1, further comprises the steps of:
   receiving a frame from the upstream switching fabric;
   checking whether a data flow identifier of the frame is selected by the PPE; and
   discarding the frame in response to a failure to match the flow hash with the PPE.

6. The method of claim 5, further comprises the steps of:
   forwarding the frame to a downstream switching fabric after processing by the PPE, preserving the data flow identifier in the frame.

7. The method of claim 6, wherein the data flow identifier is encoded in a destination media access control address (DA MAC) of the frame at ingress to the service network.

8. The method of claim 6, wherein a service chain identifier is encoded in a virtual local area network (VLAN) such that multiple service chains can self-identifier within a single matching fabric.

9. The method of claim 1, further comprising the steps of:
   receiving a data packet;
   determining a VLAN identifier for the service chain for the data packet;
   applying a shared hashing function to header information of data packet to create the flow hash;
   encoding the flow hash as destination media access control address (DA MAC) of frame corresponding to received data packet to be forwarded the service chain; and
   forwarding the frame to the switching fabric configured by the PPE.

10. The method of claim 1, further comprising the step of:
    detecting an operations administration and management (OAM) frame having the data flow identifier and forwarding the OAM frame as a standard fram with the data flow identifier.

11. A network device in a service network, the network device to execute a packet processing element (PPE) of a plurality of PPEs, where each PPE in the plurality of PPEs executes a stage of packet processing for the service network, where the plurality of PPEs are connected to one another by a plurality of switch fabrics, the PPE to self-select a subset of a set of equivalent service chains to service, each service chain defining a subset and sequence of the plurality of PPEs, the PPE to self-select the subset of equivalent service chains to process based upon proper knowledge of the plurality of PPEs servicing that stage of the set of service chains such that there is spreading of load across all available PPEs in that stage, there is no single point of failure, and minimal reassignment of PPEs for a set of equivalent data flows traversing the plurality of PPEs of the service network from changes in topology of the plurality of PPEs in the service network, the network device comprising:
- a non-transitory machine readable storage device to provide data storage for a network processor, the non-transitory machine readable storage device to store instructions to be executed by the network processor including a load balancing (LB) synchronization module, an LB table management module, an LB generation module and a switch configuration module; and
- the network processor coupled to the non-transitory machine readable storage device, the network processor configured to execute the PPE, the PPE including the LB synchronization module, the LB table management module, the LB generation module and the switch configuration module,
- the LB synchronization module configured to detect a change in the topology of the plurality of PPEs and share a current LB table and next LB table with the plurality of PPEs in the service network,
- the LB table management module configured to transition the PPE to the next LB table by replacing the current LB table,
- the LB generation module configured to generate the next load balancing (LB) table to adjust service chain routes for the changed topology, the generation using a shared transform algorithm to replace the current LB table, the next LB table and the current LB table identifying next hops for all service chains in the service network, and
- the switch configuration module configured to program an upstream switch fabric to forward to the PPE a specific subset of frames selected by the PPE for processing according to the next LB table.

12. The network device of claim 11, wherein the LB synchronization module is further configured to generate a digest of the current LB table and the next LB table, where the next LB table has been adjusted in accordance to a detected change, and broadcast the digest to the plurality of PPEs.

13. The network device of claim 11, wherein the LB table management module is further configured to confirm quiescence of current flow hash selections of the PPE before the transitioning to the next LB table.

14. The network device of claim 11, wherein the LB synchronization module is further configured to confirm synchronization of the current LB table and the next LB table amongst the plurality of PPEs before transitioning to the next LB table.

15. The network device of claim 11, wherein the PPE further comprises:
- a frame checker configured to receive a frame from the upstream switching fabric and check whether a data flow identifier of the frame is selected by the PPE, and discard the frame in response to a failure to match the flow hash with the PPE.

16. The network device of claim 15, further comprising:
- a forwarding module configured to forward the frame to a downstream switching fabric after processing by the PPE, preserving the data flow identifier in the frame.

17. The network device of claim 16, wherein the data flow identifier is encoded in a destination media access control address (DA MAC) of the frame at ingress to the service network.

18. The network device of claim 17, wherein a service chain identifier is encoded in a virtual local area network (VLAN) such that multiple service chains can self-identify within a single switching fabric.

19. The network device of claim 11, further comprising:
- a service chain identification module configured to receive a data packet and determine a VLAN identifier (VID) for the service chain for the data packet;
- a data flow identifier generation module configured to apply a shared hashing function to header information of data packet to create the flow hash and encode the flow hash as destination media access control address (DA MAC) of frame corresponding to received data packet to be forwarded the service chain; and
- a service chain forwarding module configured to forward the frame to the switching fabric configured by the PPE.

* * * * *

UNITED STATES PATENT AND TRADEMARK OFFICE
CERTIFICATE OF CORRECTION

| | | |
|---|---|---|
| PATENT NO. | : 9,160,666 B2 | Page 1 of 1 |
| APPLICATION NO. | : 13/898148 | |
| DATED | : October 13, 2015 | |
| INVENTOR(S) | : Allan et al. | |

It is certified that error appears in the above-identified patent and that said Letters Patent is hereby corrected as shown below:

In the claims,

In Column 16, Line 52, in Claim 10, delete "fram" and insert -- frame --, therefor.

Signed and Sealed this
Nineteenth Day of April, 2016

Michelle K. Lee
*Director of the United States Patent and Trademark Office*